A. J. McCAULEY.
CAR TRUCK.
APPLICATION FILED OCT. 11, 1909.
1,007,473.
Patented Oct. 31, 1911.
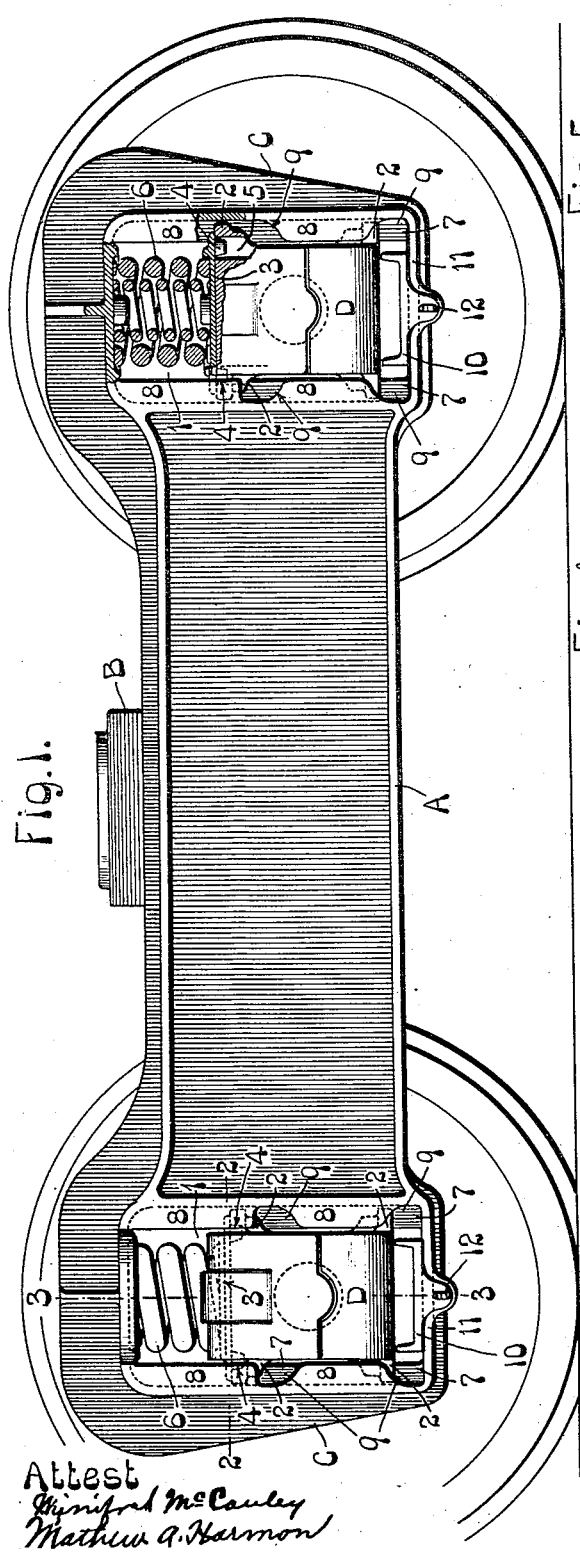
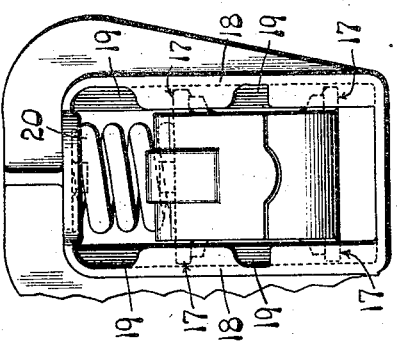
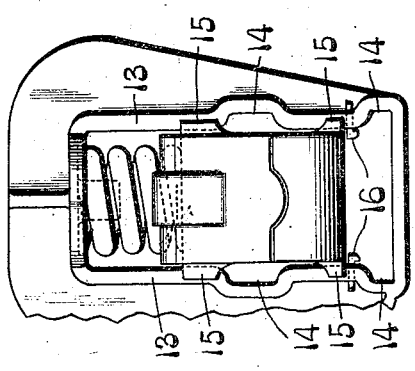
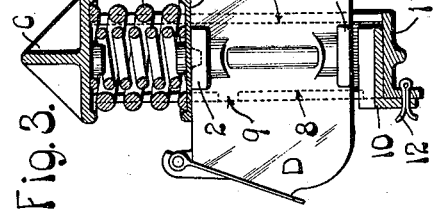
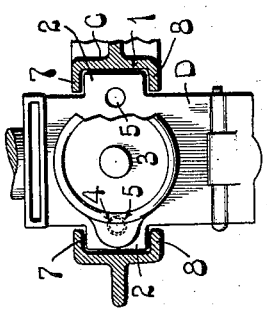
Attest
Winifred McCauley
Mathew A. Harmon
Inventor:
Albert J. McCauley

UNITED STATES PATENT OFFICE.

ALBERT J. McCAULEY, OF CHICAGO, ILLINOIS, ASSIGNOR TO THE J. S. ANDREWS COMPANY, OF CHICAGO, ILLINOIS, A CORPORATION OF WEST VIRGINIA.

CAR-TRUCK.

1,007,473.  Specification of Letters Patent.  Patented Oct. 31, 1911.

Application filed October 11, 1909. Serial No. 522,134.

*To all whom it may concern:*

Be it known that I, ALBERT J. MCCAULEY, a citizen of the United States, residing at Chicago, Illinois, have invented a certain new and useful Improvement in Car-Trucks, of which the following is a full, clear, and exact description, such as will enable others skilled in the art to which it appertains to make and use the same, reference being had to the accompanying drawings, in which—

Figure 1 is a side elevation of a car truck constructed in accordance with my invention; Fig. 2 is a horizontal sectional view taken on the line 2—2 of Fig. 1; Fig. 3 is a vertical sectional view taken approximately on the line 3—3 of Fig. 1; Fig. 4 is a detail view illustrating a modified form, and Fig. 5 is a similar view illustrating a further modification.

This invention relates to improvements in car trucks, more particularly trucks of the pedestal type.

In the preferred form of my invention the side walls of the pedestals are provided with recesses and the journal boxes have guide lugs which coöperate with said walls. In removing the journal boxes their guide lugs are passed through the recesses in said side walls, but when the truck is in service the sliding pedestals are provided with means for maintaining said lugs and recesses out of alinement.

Referring to the drawings, A indicates a cast metal side frame and B indicates the bolster. Pedestals C are preferably integrally connected together and provided with openings 1 which receive journal boxes D. The journal boxes may, if desired, be of the Master Car Builders' type, having bolt lugs 2 on their side walls. As boxes of this particular type are not provided with integral spring seats, a separate spring seat 3 is preferably mounted on each journal box, said spring seat being provided with lugs 4 which extend into apertures 5. Springs 6, arranged between the spring seats 3 and the top walls of the journal box receiving openings, constitute yielding supports for the truck frame and allow it to slide vertically. The side walls of the pedestals are preferably provided with substantially channel shaped portions which coöperate with the journal box lugs, said lugs being locked between flanges 7 and 8, as shown in Fig. 2.

These side walls also have recesses 9 which, when alined with the journal box lugs, allow the journal boxes to be removed from the pedestals. As the service shocks cause the pedestals to move vertically, the journal boxes would be liable to fall out of openings 1, if some means were not provided for maintaining the recesses 9 out of alinement with lugs 2. The means shown in Fig. 1 are removable fillers 10, arranged between the journal boxes and the bottom walls 11. 12 indicates split keys connecting fillers 10 to the truck frame.

Fig. 4 illustrates a form wherein the side walls of a pedestal are formed by flanges 13, said walls being provided with recesses 14. The journal box has guide lugs 15 which coöperate with flanges 13. Split keys 16, arranged below the journal boxes, maintain lugs 15 in engagement with flanges 13.

In the modified form shown in Fig. 5, all of the pedestal walls are integrally connected together, and the journal box has lugs 17 which coöperate with the side walls 18. The journal box lugs are held out of alinement with recesses 19, by a spring 20. In removing the journal box, the first step is to raise the pedestal, then remove springs 20 and thereafter allow the pedestal to move downwardly until the lugs 17 are alined with recesses 19.

Having thus described the invention, what is claimed as new and desired to be secured by Letters Patent is:

1. A truck frame provided with openings the walls of which are integrally connected together, journal boxes mounted in said openings, and means for retaining said parts in operative position, said means including springs interposed between the journal boxes and the top walls of said openings and removable members interposed between the journal boxes and the bottom walls of said openings.

2. A vertically movable truck frame having journal box receiving openings, all of the walls of said openings being integrally connected together, the side walls of said openings being provided with recesses, journal boxes having lugs which coöperate with said side walls, springs above said journal boxes, the journal boxes being removable when said lugs are alined with said recesses, and removable members maintaining said lugs out of alinement with said recesses.

3. A car truck pedestal composed of casting having a journal box receiving opening, all of the walls of which are integrally connected together, the side walls of said opening being provided with recesses, a journal box having lugs which coöperate with said side walls, a spring interposed between the journal box and the top wall of said opening, the journal boxes being removable when said lugs are alined with said recesses, and a removable member arranged below the journal box for maintaining said lugs out of alinement with said recesses.

4. A car truck comprising a vertically movable truck frame having journal box receiving openings, the side, top and bottom walls of each of said openings being integrally connected together, slidable journal boxes having lugs which coöperate with vertical faces of said side walls, springs above said journal boxes, the side walls of said openings being shaped so as to primarily receive the journal boxes at an abnormal position and thereafter allow the truck frame to be moved vertically to its operative position, and removable members retaining said parts in operative position.

5. A vertically movable truck side having journal box receiving openings the walls of which are permanently connected together, the side walls of said openings being provided with recesses, journal boxes having lugs which coöperate with said side walls, springs above said journal boxes, the journal boxes being removable when their lugs are alined with said recesses, and removable fillers interposed between said journal boxes and the bottom walls of said openings.

6. A car truck comprising journal boxes having projections on their side walls, a slidable side frame having journal box receiving openings, the walls of which are integrally connected together, a portion of the side walls of said openings being substantially channel shaped in cross section, other parts of said side walls being shaped to receive the journal box projections and allow them to be inserted in said channel shaped portions, springs interposed between the journal boxes and the top walls of said openings, and removable members interposed between the journal boxes and the bottom walls of said openings.

7. A vertically movable truck frame having journal box receiving openings, all of the walls of said openings being integrally connected together, journal boxes slidably mounted in said openings, springs above said journal boxes, each of said journal boxes being removable when located adjacent to an end wall of the opening within which it is slidably mounted, and removable members spacing the journal boxes away from said end walls.

In testimony whereof I hereunto affix my signature in the presence of two witnesses, this 7th day of October, 1909.

ALBERT J. McCAULEY.

Witnesses:
JEAN A. MACDONEL,
FRANCES B. HARTY.